United States Patent
Fujikawa et al.

(10) Patent No.: US 7,378,185 B2
(45) Date of Patent: May 27, 2008

(54) PRISMATIC LITHIUM SECONDARY BATTERY HAVING A POROUS HEAT RESISTANT LAYER

(75) Inventors: Masato Fujikawa, Osaka (JP); Kohei Suzuki, Osaka (JP); Kaoru Inoue, Osaka (JP); Mikinari Shimada, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 4 days.

(21) Appl. No.: 11/402,056

(22) Filed: Apr. 12, 2006

(65) Prior Publication Data

US 2006/0234117 A1    Oct. 19, 2006

(30) Foreign Application Priority Data

Apr. 15, 2005  (JP) .............................. 2005-117906

(51) Int. Cl.
*H01M 2/18* (2006.01)
*H01M 2/16* (2006.01)
*H01M 4/00* (2006.01)

(52) U.S. Cl. .................... 429/130; 429/94; 429/144

(58) Field of Classification Search ................ 429/130, 429/94, 144
See application file for complete search history.

(56) References Cited

U.S. PATENT DOCUMENTS 5,462,820 A * 10/1995 Tanaka .................... 429/174

5,741,608 A * 4/1998 Kojima et al. ................ 429/94
6,053,953 A   4/2000 Tomiyama et al.
2002/0055036 A1* 5/2002 Shinohara et al. ........... 429/62

FOREIGN PATENT DOCUMENTS

| JP | 07-220759 | | 8/1995 |
| JP | 07220759 A | * | 8/1995 |
| JP | 9-147914 A | | 6/1997 |
| JP | 9-161757 A | | 6/1997 |
| JP | 2001-6658 A | | 1/2001 |

OTHER PUBLICATIONS

H. Kim et al. Electrochemical and physical properties of composite polymer electrolyte of poly (methyl methacrylate) and poly (ethylene glycol diacrylate). Journal of Power Sources. 2003. pp. 221-224.124.

* cited by examiner

*Primary Examiner*—Mark Ruthkosky
*Assistant Examiner*—Karie O'Neill
(74) *Attorney, Agent, or Firm*—McDermott Will & Emery LLP

(57) ABSTRACT

A prismatic lithium secondary battery includes: a prismatic battery can having a bottom, a side wall, and an open top; an electrode assembly; a non-aqueous electrolyte; and a sealing plate covering the open top of the battery can that accommodates the electrode assembly and the non-aqueous electrolyte. The electrode assembly includes: a positive electrode; a negative electrode; and a porous heat-resistant layer and a separator that are interposed between the positive and negative electrodes. The side wall of the battery can has two rectangular main flat portions that are opposed to each other, and the thickness A of the porous heat-resistant layer and the thickness B of each of the main flat portions of the side wall satisfy the relation: $0.003 \leq A/B \leq 0.05$.

5 Claims, 2 Drawing Sheets

PRISMATIC LITHIUM SECONDARY BATTERY HAVING A POROUS HEAT RESISTANT LAYER

FIELD OF THE INVENTION

The present invention relates to a prismatic lithium secondary battery that is excellent in both safety and battery characteristics.

BACKGROUND OF THE INVENTION

Lithium secondary batteries have received attention as high-capacity power sources for portable and other appliances. Further, lithium secondary batteries have recently been receiving attention as high-output power sources for electric vehicles and the like. Chemical batteries such as lithium secondary batteries usually have a separator that electrically insulates a positive electrode from a negative electrode and holds an electrolyte. In the case of a lithium secondary battery, a micro-porous film made of polyolefin (e.g., polyethylene, polypropylene, etc.) is mainly used as the separator. The electrode assembly of a prismatic lithium secondary battery is produced by winding the positive electrode, the negative electrode, and the separator interposed between the two electrodes such that the wound assembly is substantially elliptic in cross-section.

However, when a lithium secondary battery is stored in an environment at extremely high temperatures for an extended period of time, its separator made of a micro-porous film tends to shrink. If the separator shrinks, then the positive electrode and the negative electrode may physically come into contact with each other to cause an internal short-circuit. In view of the recent tendency of separators becoming thinner with an increase in lithium secondary battery capacity, preventing an internal short-circuit becomes particularly important. Once an internal short-circuit occurs, the short-circuit may expand due to Joule's heat generated by the short-circuit current, thereby resulting in overheating of the battery.

Thus, in the event of an internal short-circuit, in order to suppress such expansion of the short-circuit, Japanese Laid-Open Patent Publication No. Hei 7-220759 proposes forming a porous heat-resistant layer that contains an inorganic filler (solid fine particles) and a binder on an electrode active material layer. Alumina, silica, or the like is used as the inorganic filler. The inorganic filler is filled in the porous heat-resistant layer, and the filler particles are bonded to one another with a relatively small amount of a binder. Since the porous heat-resistant layer is resistant to shrinking even at high temperatures, it has the function of suppressing the overheating of the battery in the event of an internal short-circuit.

Recently, in the field of the power source for portable appliances, there is an increasing need for rapid charge, and rapid charge requires charging at a high rate (e.g., 1 hour-rate or less). In the case of a high-rate charge, the electrode plate expands and contracts significantly during charge/discharge and a large amount of gas is produced, compared with a low-rate charge (e.g., 1.5 hour-rate or more). Therefore, the electrode assembly is distorted, and the porous heat-resistant layer may break since the amount of the binder contained in the porous heat-resistant layer is relatively small and the bonding between filler particles is weak. In such cases, the function of the porous heat-resistant layer of suppressing the overheating of the battery in the event of an internal short-circuit is impaired.

BRIEF SUMMARY OF THE INVENTION

It is therefore an object of the present invention to prevent a breakage of the porous heat-resistant layer and provide a prismatic lithium secondary battery that is excellent in both safety and battery characteristics.

The present invention relates to a prismatic lithium secondary battery including: a prismatic battery can having a bottom, a side wall, and an open top; an electrode assembly; a non-aqueous electrolyte; and a sealing plate covering the open top of the battery can that accommodates the electrode assembly and the non-aqueous electrolyte. The side wall of the prismatic battery can has two rectangular main flat portions that are opposed to each other. The electrode assembly includes: a positive electrode; a negative electrode; and a porous heat-resistant layer and a separator that are interposed between the positive and negative electrodes. The thickness A of the porous heat-resistant layer and the thickness B of each of the main flat portions of the side wall satisfy the relation: $0.003 \leq A/B \leq 0.05$.

The open top of the prismatic battery can is substantially rectangular, and the longer sides of this substantial rectangle correspond to the main flat portions. That is, the main flat portions correspond to the wider surfaces of the side wall.

It is preferred that the thickness A of the porous heat-resistant layer be 2 to 10 μm and that the thickness B of each of the main flat portions of the side wall be 160 to 1000 μm. Further, it is preferred that $0.005 \leq A/B \leq 0.03$.

The electrode assembly may be of the wound type. For example, the positive electrode is a strip-like positive electrode that comprises a positive electrode core member and a positive electrode active material layer carried on each side of the positive electrode core member, and the negative electrode is a strip-like negative electrode that comprises a negative electrode core member and a negative electrode active material layer carried on each side of the negative electrode core member. These strip-like positive and negative electrodes are wound together with the porous heat-resistant layer and the separator interposed between the positive and negative electrodes. In this case, it is preferable that the porous heat-resistant layer be carried on a surface of at least one of the two active material layers that are formed on both sides of the core member of at least one of the positive electrode and the negative electrode.

The electrode assembly may be of the stacked type. For example, the electrode assembly may be composed of at least one sheet-like positive electrode and at least one sheet-like negative electrode that are stacked with a porous heat-resistant layer and a separator interposed therebetween. In this case, the outermost electrodes preferably have an active material layer only on one side (inner side) of the core member.

The porous heat-resistant layer preferably comprises an insulating filler.

The insulating filler preferably comprises an inorganic oxide.

When the battery is charged at a high rate, a large distortion is applied to the electrode assembly. However, if the main flat portions of side wall of the battery can pushes back the electrode assembly by a sufficient force, the porous heat-resistant layer does not break. In this case, the porous heat-resistant layer can retain its shape probably because the porous heat-resistant layer is pressed against the active material layer of the positive or negative electrode.

It should be noted that the porous heat-resistant layer is also required to have the function of holding an electrolyte between the positive electrode and the negative electrode.

Hence, if the porous heat-resistant layer is excessively pressed against the active material layer, the electrolyte becomes locally scarce in the electrode assembly, thereby resulting in degradation of battery characteristics.

The present invention is based on the above two findings. The present invention proposes controlling the force of the main flat portions of side wall of the battery can which pushes back the porous heat-resistant layer in an appropriate range, depending on the thickness of the porous heat-resistant layer. Accordingly, it is possible to prevent the porous heat-resistant layer from breaking and ensure safety in the event of internal short-circuits. Further, it is also possible to realize excellent battery characteristics.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
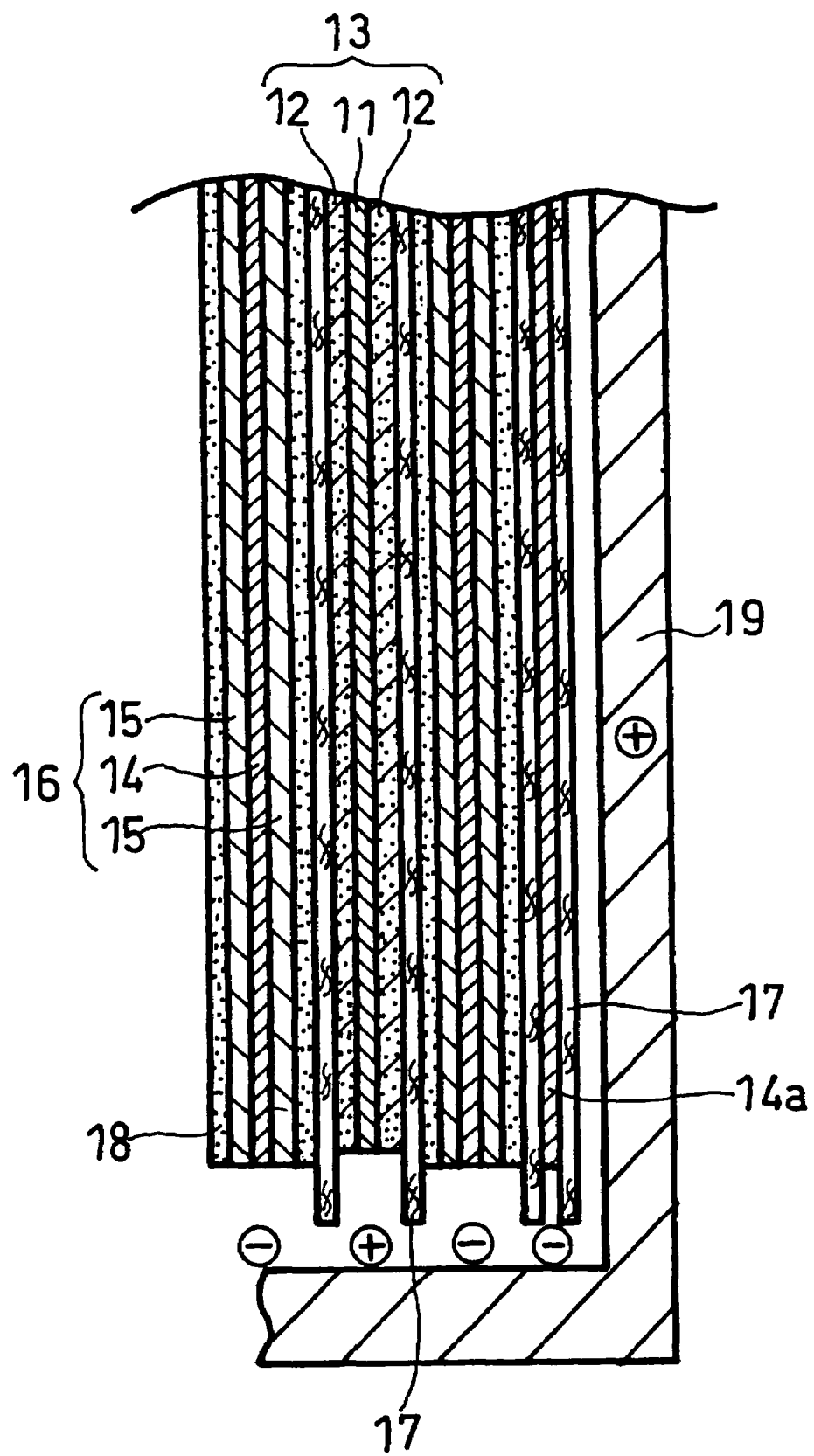
FIG. 1 is a sectional schematic view of a part of a prismatic lithium secondary battery in accordance with the present invention.

FIG. 1 is a schematic view of a part of a prismatic lithium secondary battery in accordance with the present invention. A positive electrode 13 has a strip-like positive electrode core member 11 and a positive electrode active material layer 12 carried on each side of the core member 11. A negative electrode 16 has a strip-like negative electrode core member 14 and a negative electrode active material layer 15 carried on each side of the core member 14. A porous heat-resistant layer 18 is carried on the surface of each negative electrode active material layer 15. The porous heat-resistant layer 18 has the function of preventing the expansion of an internal short-circuit. The positive electrode 13 and the negative electrode 16 are wound together with a strip-like separator 17 and the porous heat-resistant layer 18 interposed between the two electrodes, to form an electrode assembly. An exposed part 14a of the negative electrode core member is positioned in the outermost turn of the electrode assembly. The electrode assembly is housed in a prismatic battery can 19.

In the present invention, the thickness A of the porous heat-resistant layer and the thickness B of the main flat portions of side wall of the battery can satisfy the relation: $0.003 \leq A/B \leq 0.05$. The porous heat-resistant layer has the function of ensuring short-circuit resistance (first function) and the function of holding an electrolyte (second function). If the force of the main flat portions of side wall of the battery can which pushes back the electrode assembly is insufficient, the porous heat-resistant layer is likely to break during a high-rate charge, so that the first function is impaired. On the other hand, if the force of the main flat portions of side wall of the battery can which pushes back the electrode assembly is excessive, the porous heat-resistant layer is strongly compressed, so that it cannot hold a sufficient amount of an electrolyte. As a result, the second function is impaired.

When $A/B \leq 0.003$, the thickness A of the porous heat-resistant layer is too thin relative to the thickness B of the main flat portions of side wall of the battery can. If the porous heat-resistant layer is thin, the amount of the electrolyte held therein is small. In addition, due to the large pressure exerted on the electrode assembly from the main flat portions of side wall of the battery can, the electrolyte tends to be squeezed out of the porous heat-resistant layer. As a result, the electrolyte becomes locally scarce in the electrode assembly, thereby resulting in degradation of battery characteristics. In terms of optimizing the balance between the first function and the second function, desirably $0.005 \leq A/B$, and more desirably $0.01 \leq A/B$.

When $0.05 < A/B$, the thickness A of the porous heat-resistant layer is too thick relative to the thickness B of the main flat portions of side wall of the battery can. If the porous heat-resistant layer is thick, its flexibility deteriorates, so that the porous heat-resistant layer becomes brittle. Hence, when the electrode assembly deforms during a high-rate charge, the porous heat-resistant layer is likely to break. In addition, since the force of the main flat portions of side wall of the battery can which pushes back the electrode assembly is insufficient, the porous heat-resistant layer is not sufficiently supported. Thus, the porous heat-resistant layer easily breaks and the short-circuit resistance of the battery degrades. In terms of optimizing the balance between the first function and the second function, desirably $A/B \leq 0.03$, and more desirably $A/B \leq 0.025$. From the above, preferably $0.005 \leq A/B \leq 0.03$, and more preferably $0.01 \leq A/B \leq 0.025$.

The thickness A of the porous heat-resistant layer is preferably 2 to 10 µm, and more preferably 3 to 8 µm. If the thickness A is too thin, the function of improving short-circuit resistance or the function of holding the electrolyte may become insufficient. If the thickness A is too thick, there is an excessively large distance between the positive electrode and the negative electrode, which may result in degradation of the output characteristics.

The thickness B of the main flat portions of side wall of the battery can is preferably 160 to 1000 µm, and more preferably 200 to 500 µm. If the thickness B is too thin, it may be difficult to form the battery can. If the thickness B is too thick, it becomes difficult to heighten the energy density of the battery.

A micro-porous film is preferably used as the separator. The material of the micro-porous film is preferably polyolefin, and the polyolefin is preferably polyethylene, polypropylene, or the like. A micro-porous film comprising both polyethylene and polypropylene may also be used. The thickness of the micro-porous film is preferably 8 to 20 µm in terms of maintaining a high capacity design.

The porous heat-resistant layer may be formed on only the surface of the positive electrode active material layer or only the surface of the negative electrode active material layer. Alternatively, it may be formed on the surface of the positive electrode active material layer and the surface of the negative electrode active material layer. However, in order to avoid an internal short-circuit in a reliable manner, the porous heat-resistant layer is desirably formed on the surface of the negative electrode active material layer that is designed to have a larger area than that of the positive electrode active material layer. Also, the porous heat-resistant layer may be formed on the active material layer on one side of the core member or may be formed on the active material layers on both sides of the core member. Further, the porous heat-resistant layer is desirably adhered to the surface of the active material layer.

The porous heat-resistant layer may be in the form of an independent sheet. However, since the porous heat-resistant layer in sheet form does not have a high mechanical strength, it may be difficult to handle. Also, the porous heat-resistant layer may be formed on the surface of the separator. However, since the separator shrinks at high temperatures, close attention must be given to manufacturing conditions of the porous heat-resistant layer. In terms of eliminating such concern, it is also desirable that the porous heat-resistant layer be formed on the surface of the positive electrode active material layer or the surface of the negative electrode active material layer. The porous heat-resistant layer has a large number of pores. Thus, even if it is formed on the surface of the positive electrode active material layer, negative electrode active material layer or separator, it does not interfere with the movement of lithium ions. Porous heat-resistant layers having the same composition or a different composition may be laminated.

The porous heat-resistant layer preferably contains an insulating filler and a binder. Such a porous heat-resistant layer is formed by applying a raw material paste, containing an insulating filler and a small amount of a binder, onto the surface of the electrode active material layer with a doctor blade or a die coater and drying it. The raw material paste is prepared by mixing an insulating filler, a binder, and a liquid component, for example, with a double-arm kneader.

Also, the porous heat-resistant layer may be a film formed of fibers of a highly heat-resistant resin. The highly heat-resistant resin is preferably aramid, polyamide imide, etc. However, the porous heat-resistant layer comprising an insulating filler and a binder has a higher structural strength, due to the action of the binder, than the film formed of fibers of a highly heat-resistant resin and is preferable.

The insulating filler may comprise fibers or beads of the highly heat-resistant resin, but it preferably comprises an inorganic oxide. Since inorganic oxides are hard, they can maintain the distance between the positive electrode and the negative electrode in an appropriate range even if the electrode expands due to charge/discharge. Among inorganic oxides, for example, alumina, silica, magnesia, titania, and zirconia are particularly preferable, because they are electrochemically highly stable in the operating environment of lithium secondary batteries. They may be used singly or in combination of two or more of them. Also, the insulating filler may be a highly heat-resistant resin such as aramid or polyamide imide. It is also possible to use a combination of an inorganic oxide and a highly heat-resistant resin.

In the porous heat-resistant layer comprising such an insulating filler and a binder, the amount of the binder is preferably 1 to 10 parts by weight, more preferably 2 to 8 parts by weight, per 100 parts by weight of the insulating filler, in order to maintain its mechanical strength and its ionic conductivity. Most binders and thickeners inherently swell with a non-aqueous electrolyte. Thus, if the amount of the binder exceeds 10 parts by weight, the binder swells excessively to close the pores of the porous heat-resistant layer, so that the ionic conductivity may lower and the battery reaction may be impeded. On the other hand, if the amount of the binder is less than 1 part by weight, the mechanical strength of the porous heat-resistant layer may degrade.

The binder used in the porous heat-resistant layer is not particularly limited, but polyvinylidene fluoride (hereinafter referred to as PVDF), polytetrafluoroethylene (hereinafter referred to as PTFE), and polyacrylic acid-type rubber particles (e.g., BM-500B (trade name) available from Zeon Corporation), for example, are preferred. It is preferred to use PTFE or BM-500B in combination with a thickener. The thickener is not particularly limited, but carboxymethyl cellulose (hereinafter referred to as CMC), polyethylene oxide (hereinafter referred to as PEO), and modified acrylonitrile rubber (e.g., BM-720H (trade name) available from Zeon Corporation), for example, are preferred.

The porosity of the porous heat-resistant layer comprising the insulating filler and the binder is preferably 40 to 80%, more preferably 45 to 65%, in order to maintain its mechanical strength and secure the ionic conductivity. When the porous heat-resistant layer with a porosity of 40 to 80% is impregnated with a suitable amount of electrolyte, the electrode assembly swells to a suitable extent. As a result, the swollen electrode assembly presses the inner side wall of the battery can to a suitable extent. When this effect obtained from the porosity of 40 to 80% is synergistically combined with the effect of optimization of the A/B ratio, a battery that is particularly excellent in the balance between the first function and the second function can be obtained.

It should be noted that the porosity of the porous heat-resistant layer can be controlled by changing the median diameter of the insulating filler, the amount of the binder, and the drying conditions of the raw material paste. For example, increasing the drying temperature or the flow rate of hot air for the drying results in a relative increase in porosity. The porosity can be calculated from, for example, the thickness of the porous heat-resistant layer, the amounts of the insulating filler and the binder, and the true specific gravities of the insulating filler and the binder. The thickness of the porous heat-resistant layer can be determined by taking an SEM photo of several cross-sections (for example, 10 cross-sections) of an electrode and averaging the thicknesses in the several cross-sections. Also, the porosity can be determined with a mercury porosimeter.

The positive electrode includes, for example, a positive electrode core member and a positive electrode active material layer carried on each side thereof. The positive electrode core member is, for example, in the form of a strip suitable for winding and comprises Al, an Al alloy, or the like. The positive electrode active material layer contains a positive electrode active material as an essential component and may contain optional components such as a conductive agent and a binder. These materials are not particularly limited, but a preferable positive electrode active material is a lithium-containing transition metal oxide. Among lithium-containing transition metal oxides, lithium cobaltate, modified lithium cobaltate, lithium nickelate, modified lithium nickelate, lithium manganate and modified lithium manganate are preferred, for example.

The negative electrode includes, for example, a negative electrode core member and a negative electrode active material layer carried on each side thereof. The negative electrode core member is, for example, in the form of a strip suitable for winding and comprises Cu, a Cu alloy, or the like. The negative electrode active material layer contains a negative electrode active material as an essential component and may contain optional components such as a conductive agent and a binder. These materials are not particularly limited, but preferable negative electrode active materials include various natural graphites, various artificial graphites, silicon-containing composite materials such as silicide, lithium metal, and various alloy materials.

Exemplary binders for the positive or negative electrode include PTFE, PVDF, and styrene butadiene rubber. Exemplary conductive agents include acetylene black, ketjen black (registered trademark), and various graphites.

The non-aqueous electrolyte preferably comprises a non-aqueous solvent dissolving a lithium salt. The lithium salt is not particularly limited, but for example, $LiPF_6$ and $LiBF_4$ are preferred. Such lithium salts may be used singly or in combination of two or more of them. The non-aqueous solvent is not particularly limited, but preferable examples include ethylene carbonate (EC), dimethyl carbonate (DMC), diethyl carbonate (DEC), and ethyl methyl carbonate (EMC). Such non-aqueous solvents may be used singly or in combination of two or more of them.

The material of the battery can must be electrochemically stable in the operating voltage range of lithium secondary batteries. For example, aluminum, iron, or stainless steel is preferably used. Also, the battery can may be plated with nickel or tin.

The present invention is hereinafter described more specifically by way of Examples.

EXAMPLE 1

(Battery 1)

(i) Preparation of Positive Electrode

A positive electrode mixture paste was prepared by stirring 3 kg of lithium cobaltate, 1 kg of PVDF#1320 available from KUREHA CORPORATION (N-methyl-2-pyrrolidone (hereinafter referred to as NMP) solution containing 12% by weight of PVDF), 90 g of acetylene black, and a suitable amount of NMP with a double-arm kneader. This paste was applied onto both sides of a positive electrode core member comprising a 15-μm-thick aluminum foil, dried, and rolled, to form a positive electrode with positive electrode active material layers. This positive electrode had a total thickness of 130 μm. The positive electrode was cut to a strip with a width of 43 mm.

(ii) Preparation of Negative Electrode

A negative electrode mixture paste was prepared by stirring 3 kg of artificial graphite, 75 g of BM-400B available from Zeon Corporation (aqueous dispersion containing 40% by weight of modified styrene butadiene rubber), 30 g of CMC, and a suitable amount of water with a double-arm kneader. This paste was applied onto both sides of a negative electrode core member comprising a 10-μm-thick copper foil, dried, and rolled to form a negative electrode with negative electrode active material layers. This negative electrode had a total thickness of 140 μm. The negative electrode was cut to a strip with a width of 45 mm.

(iii) Formation of Porous Heat-Resistant Layer

A raw material paste was prepared by stirring 970 g of alumina with a median diameter of 0.3 μm (insulating filler), 375 g of BM-720H available from Zeon Corporation (NMP solution containing 8% by weight of modified polyacrylonitrile rubber (binder)), and a suitable amount of NMP with a double-arm kneader. This raw material paste was applied onto the surfaces of the negative electrode active material layers and dried under reduced pressure at 120° C. for 10 hours, to form 0.5-μm-thick porous heat-resistant layers.

The porosity of each porous heat-resistant layer was 48%. The porosity was calculated from: the thickness of the porous heat-resistant layer determined by taking an SEM photo of a cross-section thereof; the amount of alumina in the porous heat-resistant layer of a given area obtained by X-ray fluorescence analysis; the true specific gravities of alumina and the binder; and the weight ratio between alumina and the binder.

(iv) Preparation of Non-Aqueous Electrolyte $LiPF_6$ was dissolved at a concentration of 1 mol/liter in a solvent mixture of ethylene carbonate (EC), dimethyl carbonate (DMC), and ethyl methyl carbonate (EMC) in a volume ratio of 1:1:1, and this solution was mixed with 3% by weight of vinylene carbonate, to prepare a non-aqueous electrolyte.

(v) Fabrication of Battery

Figure 2:
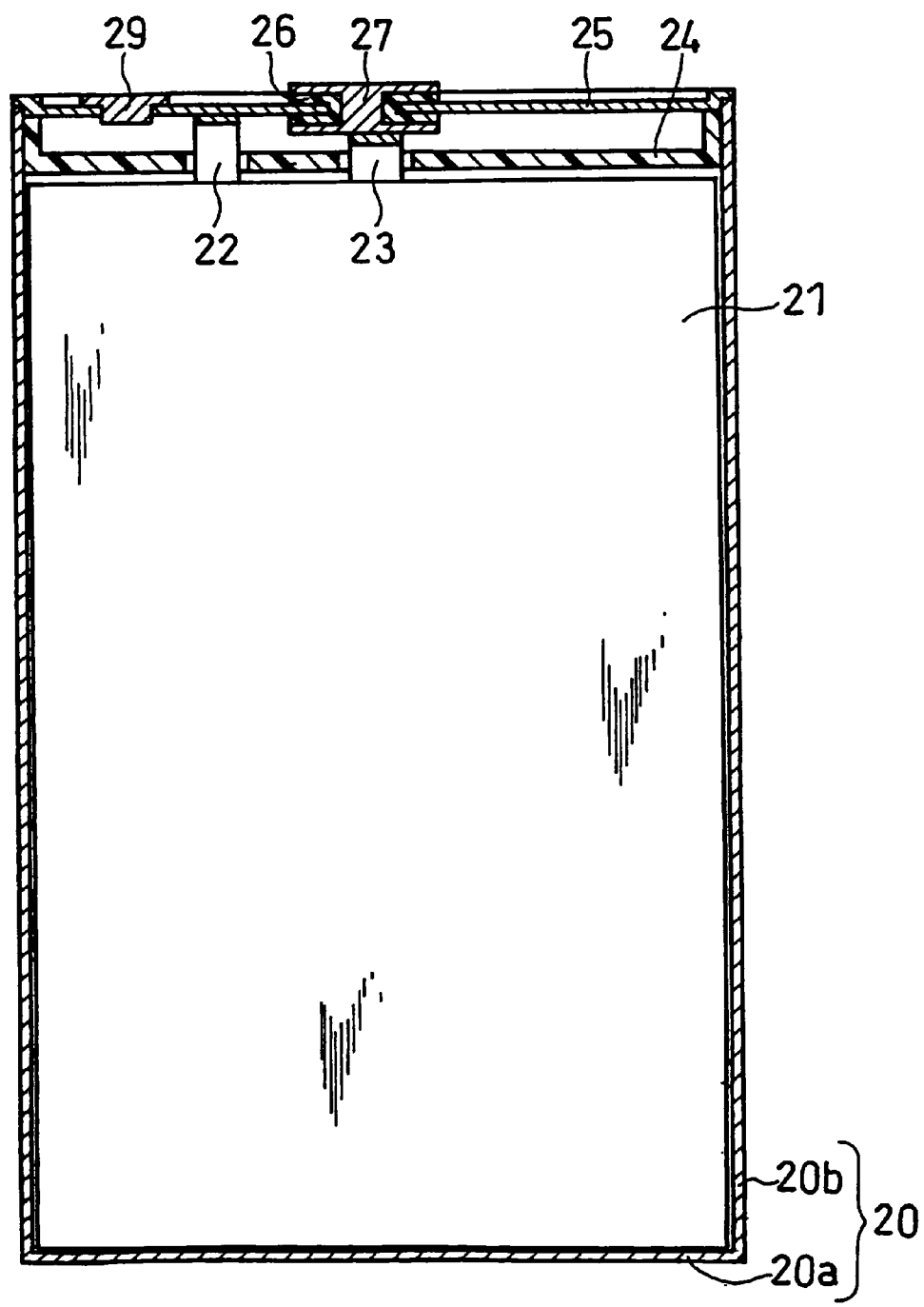
FIG. 2 is a longitudinal sectional view of a prismatic lithium secondary battery in accordance with an example of the present invention.

An explanation is made with reference to FIG. 2, in which elements other than the electrode assembly are cross-sectional.

An electrode assembly 21 with a substantially elliptic cross-section was fabricated by winding the positive electrode and the negative electrode with the porous heat-resistant layers formed on both sides thereof, with a separator comprising a 20-μm-thick polyethylene micro-porous film (A089 (trade name) available from Celgard K. K.) interposed therebetween.

The electrode assembly 21 was placed in an aluminum prismatic battery can 20. The battery can 20 has a bottom 20a and a side wall 20b. The top of the battery can 20 is open and substantially rectangular. The side wall 20b has main flat portions, and the thickness of each main flat portion was 80 μm.

Thereafter, an insulator 24 was mounted on the electrode assembly 21 to prevent a short-circuit between the battery can 20 and a positive electrode lead 22 or a negative electrode lead 23. A rectangular sealing plate 25 was fitted to the open top of the battery can 20. The sealing plate 25 had, at the center thereof, a negative electrode terminal 27 around which an insulating gasket 26 was fitted. The negative electrode lead 23 was connected to the negative electrode terminal 27, and the positive electrode lead 22 was connected to the lower face of the sealing plate 25. The open top of the battery can 20 was sealed by laser-welding the open edge and the sealing plate 25. Then, 2.5 g of the non-aqueous electrolyte was injected into the battery can 20 from the injection hole of the sealing plate 25. Lastly, the injection hole was closed with a sealing stopper 29 by welding. This completed a prismatic lithium secondary battery with a height of 50 mm, a width of 34 mm, an inner space thickness of approximately 5.2 mm, and a design capacity of 850 mAh.

(Batteries 2 to 6)

Prismatic lithium secondary batteries 2, 3, 4, 5, and 6 were produced in the same manner as the battery 1, except that the thickness of the main flat portions of side wall of the battery can was changed to 160 μm, 300 μm, 600 μm, 1000 μm, and 1500 μm, respectively.

(Batteries 7 to 12)

Prismatic lithium secondary batteries 7, 8, 9, 10, 11, and 12 were produced in the same manner as the batteries 1, 2, 3, 4, 5, and 6, respectively, except that the thickness of the porous heat-resistant layer was changed to 1 μm.

(Battery 13 to 18)

Prismatic lithium secondary batteries 13, 14, 15, 16, 17, and 18 were produced in the same manner as the batteries 1, 2, 3, 4, 5, and 6, respectively, except that the thickness of the porous heat-resistant layer was changed to 2 μm.

(Batteries 19 to 24)

Prismatic lithium secondary batteries 19, 20, 21, 22, 23, and 24 were produced in the same manner as the batteries 1, 2, 3, 4, 5, and 6, respectively, except that the thickness of the porous heat-resistant layer was changed to 3 μm.

(Batteries 25 to 32)

(i) Batteries 25 to 27, 29, 30, and 32

Prismatic lithium secondary batteries 25, 26, 27, 29, 30, and 32 were produced in the same manner as the batteries 1, 2, 3, 4, 5, and 6, except that the thickness of the porous heat-resistant layer was changed to 4 μm.

(ii) Battery 28

A prismatic lithium secondary battery 28 was produced in the same manner as the battery 1, except that the thickness of the main flat portions of side wall of the battery can was changed to 400 μm and that the thickness of the porous heat-resistant layer was changed to 4 μm.

(iii) Battery 31

A prismatic lithium secondary battery 31 was produced in the same manner as the battery 1, except that the thickness of the main flat portions of side wall of the battery can was changed to 1200 μm and that the thickness of the porous heat-resistant layer was changed to 4 μm.

(Batteries 33 to 40)

Prismatic lithium secondary batteries 33, 34, 35, 36, 37, 38, 39, and 40 were produced in the same manner as the batteries 25, 26, 27, 28, 29, 30, 31, and 32, respectively, except that the thickness of the porous heat-resistant layer was changed to 7 μm.

(Batteries 41 to 48)

Prismatic lithium secondary batteries 41, 42, 44, 45, 46, 47, and 48 were produced in the same manner as the batteries 25, 26, 27, 28, 29, 30, 31, and 32, respectively, except that the thickness of the porous heat-resistant layer was changed to 10 μm.

(Batteries 49 to 54)

Prismatic lithium secondary batteries 49, 50, 51, 52, 53, and 54 were produced in the same manner as the batteries 1, 2, 3, 4, 5, and 6, respectively, except that the thickness of the porous heat-resistant layer was changed to 20 μm.

In the batteries 2 to 54, the porosity of the porous heat-resistant layer was 46 to 49%.

[Evaluation]

The respective batteries were preliminarily charged and discharged twice and then stored in an environment at 45° C. for 7 days. Thereafter, they were evaluated in the following manner. Table 1 shows the thickness A of the porous heat-resistant layer, the thickness B of the main flat portions of side wall of the battery can, and evaluation results.

(Nail Penetration Test)

The respective batteries were charged at a charge current of 850 mA to a cut-off voltage of 4.35 V or 4.45 V. In an environment at 20° C., a 2.7-mm-diameter iron nail was driven into the side wall of each charged battery at a speed of 5 mm/sec, and the battery temperature was measured with a thermocouple fitted to the side wall of the battery. The temperature after 90 seconds was measured.

(Cycle Life Test)

In the 20° C. environment, the batteries were charged and discharged under the following condition (1) or (2) for 500 cycles. The percentage of the discharge capacity at the 500th cycle (capacity retention rate) relative to the initial discharge capacity was obtained.

Condition (1)

Constant current charge: charge current 850 mA/end of charge voltage 4.2 V

Constant voltage charge: charge voltage 4.2 V/end of charge current 100 mA

Constant current discharge: discharge current 850 mA/end of discharge voltage 3 V Condition (2)

Constant current charge: charge current 850 mA/end harge voltage 4.2 V

Constant voltage charge: charge voltage 4.2 V/end harge current 100 mA

Constant current discharge: discharge current 1700 mA/end of discharge voltage 3 V

TABLE 1

| Battery | Thickness A of porous heat-resistant layer (μm) | Thickness B of main flat portion (μm) | A/B | Nail penetration test Battery temperature after 90 sec (° C.) 4.35 V | Nail penetration test Battery temperature after 90 sec (° C.) 4.45 V | Capacity retention rate (%) 850 mA discharge 1 C | Capacity retention rate (%) 1700 mA discharge 2 C |
|---|---|---|---|---|---|---|---|
| 1 | 0.5 | 80 | 0.0063 | 93 | 112 | 76 | 57 |
| 2 | 0.5 | 160 | 0.0031 | 95 | 105 | 78 | 54 |
| 3 | 0.5 | 300 | 0.0017 | 94 | 103 | 63 | 42 |
| 4 | 0.5 | 600 | 0.0008 | 96 | 103 | 59 | 42 |
| 5 | 0.5 | 1000 | 0.0005 | 98 | 104 | 56 | 39 |
| 6 | 0.5 | 1500 | 0.0003 | 90 | 106 | 55 | 38 |
| 7 | 1 | 80 | 0.0125 | 94 | 114 | 75 | 56 |
| 8 | 1 | 160 | 0.0063 | 93 | 102 | 77 | 57 |
| 9 | 1 | 300 | 0.0033 | 90 | 104 | 80 | 55 |
| 10 | 1 | 600 | 0.0017 | 96 | 102 | 62 | 40 |
| 11 | 1 | 1000 | 0.0010 | 89 | 105 | 64 | 43 |
| 12 | 1 | 1500 | 0.0007 | 87 | 106 | 60 | 37 |
| 13 | 2 | 80 | 0.0250 | 97 | 116 | 80 | 66 |
| 14 | 2 | 160 | 0.0125 | 92 | 101 | 76 | 64 |
| 15 | 2 | 300 | 0.0067 | 90 | 100 | 81 | 66 |
| 16 | 2 | 600 | 0.0033 | 93 | 104 | 78 | 52 |
| 17 | 2 | 1000 | 0.0020 | 94 | 104 | 61 | 42 |
| 18 | 2 | 1500 | 0.0013 | 92 | 105 | 63 | 38 |
| 19 | 3 | 80 | 0.0375 | 96 | 117 | 75 | 51 |
| 20 | 3 | 160 | 0.0188 | 95 | 106 | 75 | 66 |

TABLE 1-continued

| | Thickness A of porous heat-resistant layer | Thickness B of main flat portion | | Nail penetration test Battery temperature after 90 sec (° C.) | | Capacity retention rate (%) | |
|---|---|---|---|---|---|---|---|
| | | | | | | 850 mA discharge | 1700 mA discharge |
| Battery | (μm) | (μm) | A/B | 4.35 V | 4.45 V | 1 C | 2 C |
| 21 | 3 | 300 | 0.0100 | 91 | 107 | 78 | 68 |
| 22 | 3 | 600 | 0.0050 | 87 | 103 | 81 | 63 |
| 23 | 3 | 1000 | 0.0030 | 91 | 104 | 74 | 56 |
| 24 | 3 | 1500 | 0.0020 | 94 | 105 | 64 | 46 |
| 25 | 4 | 80 | 0.0500 | 96 | 116 | 78 | 61 |
| 26 | 4 | 160 | 0.0250 | 90 | 102 | 80 | 62 |
| 27 | 4 | 300 | 0.0133 | 88 | 102 | 83 | 65 |
| 28 | 4 | 400 | 0.0100 | 85 | 105 | 77 | 64 |
| 29 | 4 | 600 | 0.0067 | 91 | 103 | 81 | 63 |
| 30 | 4 | 1000 | 0.0040 | 83 | 100 | 75 | 53 |
| 31 | 4 | 1200 | 0.0033 | 90 | 102 | 76 | 55 |
| 32 | 4 | 1500 | 0.0027 | 89 | 101 | 58 | 42 |
| 33 | 7 | 80 | 0.0875 | 123 | 133 | 78 | 66 |
| 34 | 7 | 160 | 0.0438 | 87 | 118 | 81 | 66 |
| 35 | 7 | 300 | 0.0233 | 91 | 106 | 80 | 66 |
| 36 | 7 | 400 | 0.0175 | 86 | 106 | 76 | 62 |
| 37 | 7 | 600 | 0.0117 | 93 | 103 | 78 | 64 |
| 38 | 7 | 1000 | 0.0070 | 88 | 105 | 76 | 66 |
| 39 | 7 | 1200 | 0.0058 | 84 | 105 | 74 | 54 |
| 40 | 7 | 1500 | 0.0047 | 86 | 101 | 74 | 56 |
| 41 | 10 | 80 | 0.1250 | 126 | 140 | 78 | 69 |
| 42 | 10 | 160 | 0.0625 | 118 | 131 | 79 | 68 |
| 43 | 10 | 300 | 0.0333 | 96 | 115 | 76 | 64 |
| 44 | 10 | 400 | 0.0250 | 94 | 104 | 80 | 64 |
| 45 | 10 | 600 | 0.0167 | 89 | 102 | 82 | 65 |
| 46 | 10 | 1000 | 0.0100 | 86 | 106 | 79 | 64 |
| 47 | 10 | 1200 | 0.0083 | 88 | 105 | 83 | 55 |
| 48 | 10 | 1500 | 0.0067 | 91 | 106 | 80 | 53 |
| 49 | 20 | 80 | 0.2500 | 130 | 142 | 82 | 56 |
| 50 | 20 | 160 | 0.1250 | 127 | 136 | 78 | 56 |
| 51 | 20 | 300 | 0.0667 | 124 | 135 | 84 | 52 |
| 52 | 20 | 600 | 0.0333 | 90 | 122 | 83 | 58 |
| 53 | 20 | 1000 | 0.0200 | 87 | 115 | 78 | 56 |
| 54 | 20 | 1500 | 0.0133 | 85 | 114 | 81 | 56 |

In the case of the batteries 3 to 6, 10 to 12, 17, 18, 24, and 32 with the A/B ratios (the ratio of the thickness A (μm) of the porous heat-resistant layer to the thickness B (μm) of the main flat portions of side wall of the battery can) of less than 0.003, the cycle life characteristic was remarkably low. This result is related to the fact that the thickness of the porous heat-resistant layer is thin relative to the main flat portions of the battery can. If the porous heat-resistant layer is thin, the amount of the electrolyte that it can hold is small and, in addition, the electrolyte is likely to be squeezed out due to the pressure from the main flat portions of side wall of the battery can. Therefore, the electrolyte inside the electrode assembly is believed to become scarce.

On the other hand, in the case of the batteries 33, 41, 42, 49, 50, and 51 with the A/B ratios of more than 0.05, the overheating on the nail penetration test was remarkable. When these batteries were disassembled, it was found that the porous heat-resistant layer was separated not only at the nail penetration location but also at many other areas. This result is related to the fact that the thickness of the porous heat-resistant layer is thick relative to the battery can. When the porous heat-resistant layer is thick, it becomes brittle, so it easily breaks due to deformation of the electrode assembly during a high-rate charge. Further, since the side wall of the battery can is thin, the force thereof which pushes back the electrode assembly is also weak. Probably for this reason, the porous heat-resistant layer became broken.

With respect to the batteries 1 to 12, the cycle life characteristic was remarkably low in the harsh charge/discharge condition (2) of 1700 mA discharge, regardless of the thickness of the main flat portions of side wall of the battery can. This indicates that when the porous heat-resistant layer has a thickness of 1 μm or less, it is too thin and hence the effect of the present invention decreases. It should be noted, however, that in the condition (1), even when the porous heat-resistant layer has a thickness of 1 μm or less, relatively good results were obtained.

As for the batteries 49 to 54, the cycle life characteristic was remarkably low in the condition (2) regardless of the thickness of the main flat portions of side wall of the battery can. Also, these batteries were somewhat remarkably overheated on the nail penetration test when being charged to 4.45 V. This indicates that when the porous heat-resistant layer has a thickness of 20 μm or more, it is too thick and hence the effect of the present invention decreases.

As a general tendency, when the main flat portions of side wall of the battery can are too thick (e.g., more than 1000 μm), the cycle life characteristic was low in the condition (2), and when the main flat portions of side wall of the battery can are too thin (e.g., 80 μm), the battery was significantly overheated on the nail penetration test when being charged to 4.45 V.

The prismatic lithium secondary battery of the present invention has an excellent short-circuit resistance, a high level of safety, and excellent high-rate discharge characteristics. Therefore, it can be used as a power source for any portable appliances, for example, personal digital assistants and portable electronic appliances. The prismatic lithium secondary battery of the present invention can also be used as a power source for small-sized power storage devices for home use, two-wheel motor vehicles, electric vehicles, and hybrid electric vehicles, and its application is not particularly limited.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A prismatic lithium secondary battery comprising: a prismatic battery can having a bottom, a side wall, and an open top; an electrode assembly; a non-aqueous electrolyte; and a sealing plate covering the open top of said battery can that accommodates said electrode assembly and said non-aqueous electrolyte, wherein said electrode assembly comprises: a positive electrode having a positive electrode active material layer; a negative electrode having a negative electrode active material layer; and a porous heat-resistant layer and a separator that are interposed between the positive and negative electrodes, said porous heat-resistant layer comprises an insulating filler and being in contact with the active material layer of said positive or negative electrode, said side wall of the prismatic battery can has two rectangular main flat portions that are opposed to each other, and a thickness A of said porous heat-resistant layer is 2 to 10 μm, a thickness B of each of said main flat portions is 160 to 1000 μm, and A and B satisfy the relation: $0.005 \leq A/B \leq 0.03$.

2. The prismatic lithium secondary battery in accordance with claim 1, wherein said positive electrode is a strip-like positive electrode that comprises a positive electrode core member and the positive electrode active material layer carried on each side of the positive electrode core member, said negative electrode is a strip-like negative electrode that comprises a negative electrode core member and the negative electrode active material layer carried on each side of the negative electrode core member, said strip-like positive electrode and said strip-like negative electrode are wound together with said porous heat-resistant layer and said separator interposed between the positive and negative electrodes, and said porous heat-resistant layer is carried on a surface of at least one of the two active material layers that are formed on both sides of the core member of at least one of the positive electrode and the negative electrode.

3. The prismatic lithium secondary battery in accordance with claim 1, wherein said insulating filler comprises an inorganic oxide.

4. The prismatic lithium secondary battery in accordance with claim 1, wherein the porosity of the porous heat-resistant layer is 40 to 80%.

5. The prismatic lithium secondary battery in accordance with claim 1, wherein the porosity of the porous heat-resistant layer is 40 to 65%.

* * * * *